Figure 5:
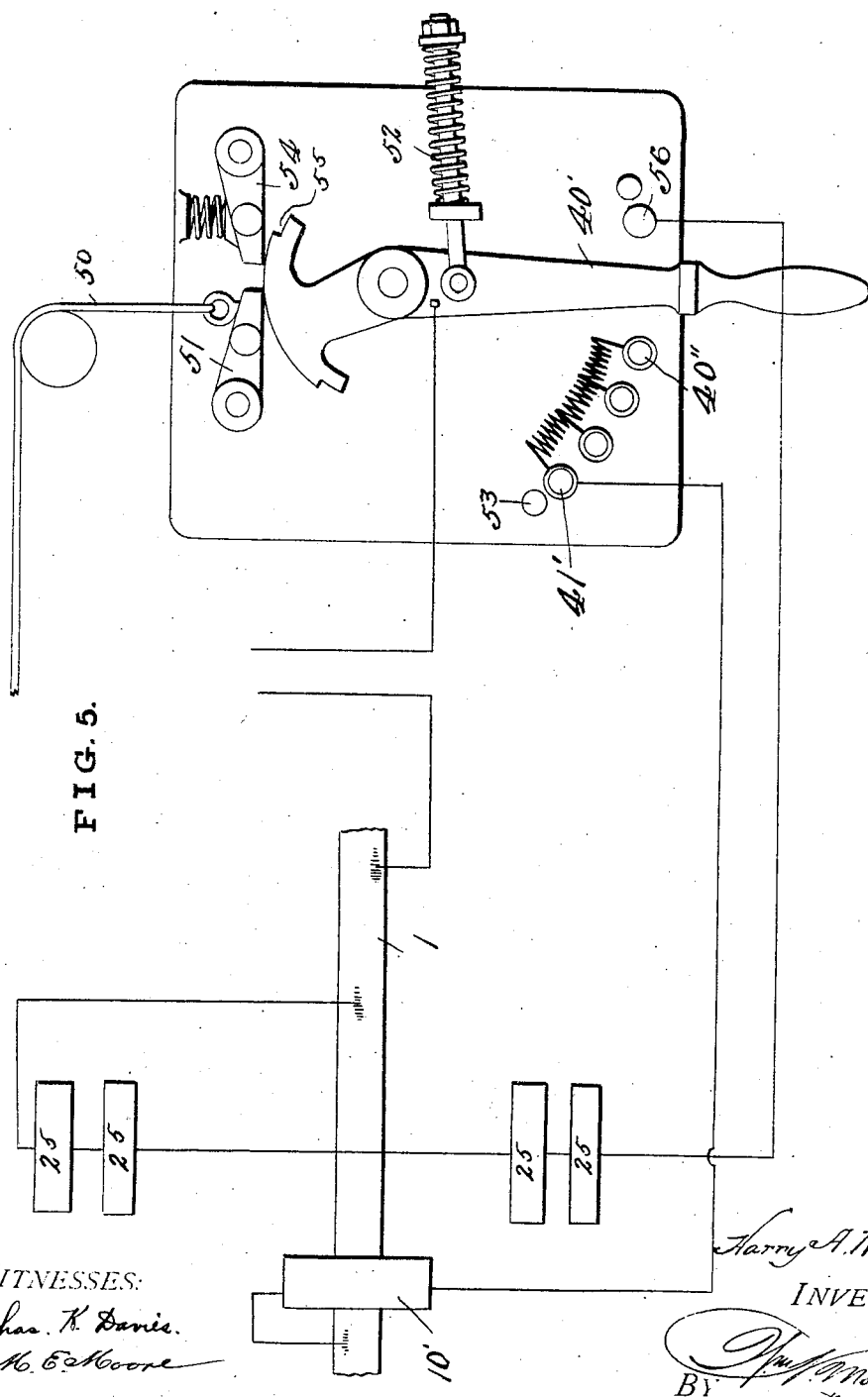

No. 785,926. PATENTED MAR. 28, 1905.
H. A. WILLIAMS.
FRICTION CLUTCH.
APPLICATION FILED MAY 12, 1904.
4 SHEETS—SHEET 1.
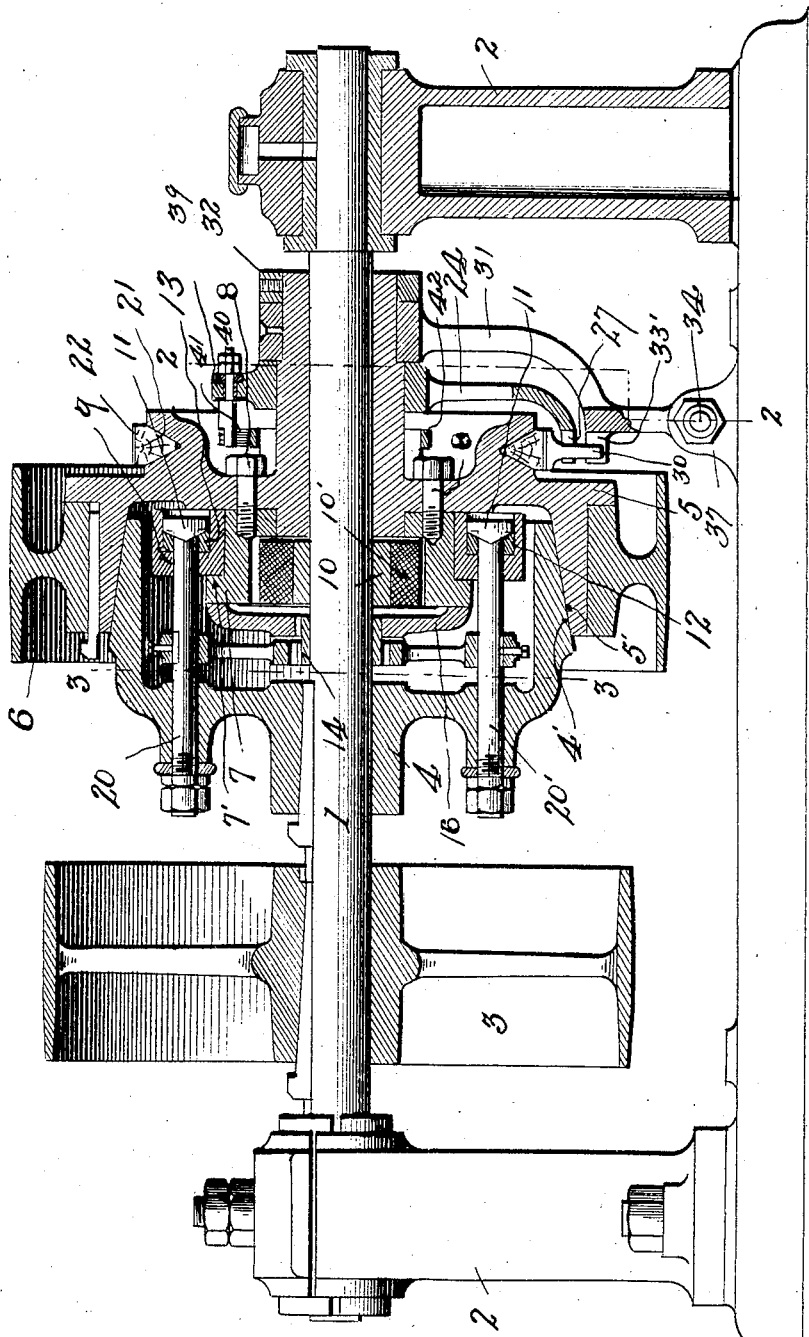
Fig. I.
WITNESSES:
Chas. K. Davies
M. E. Moore
Harry A. Williams
INVENTOR
BY Wm. N. Moore
Attorney

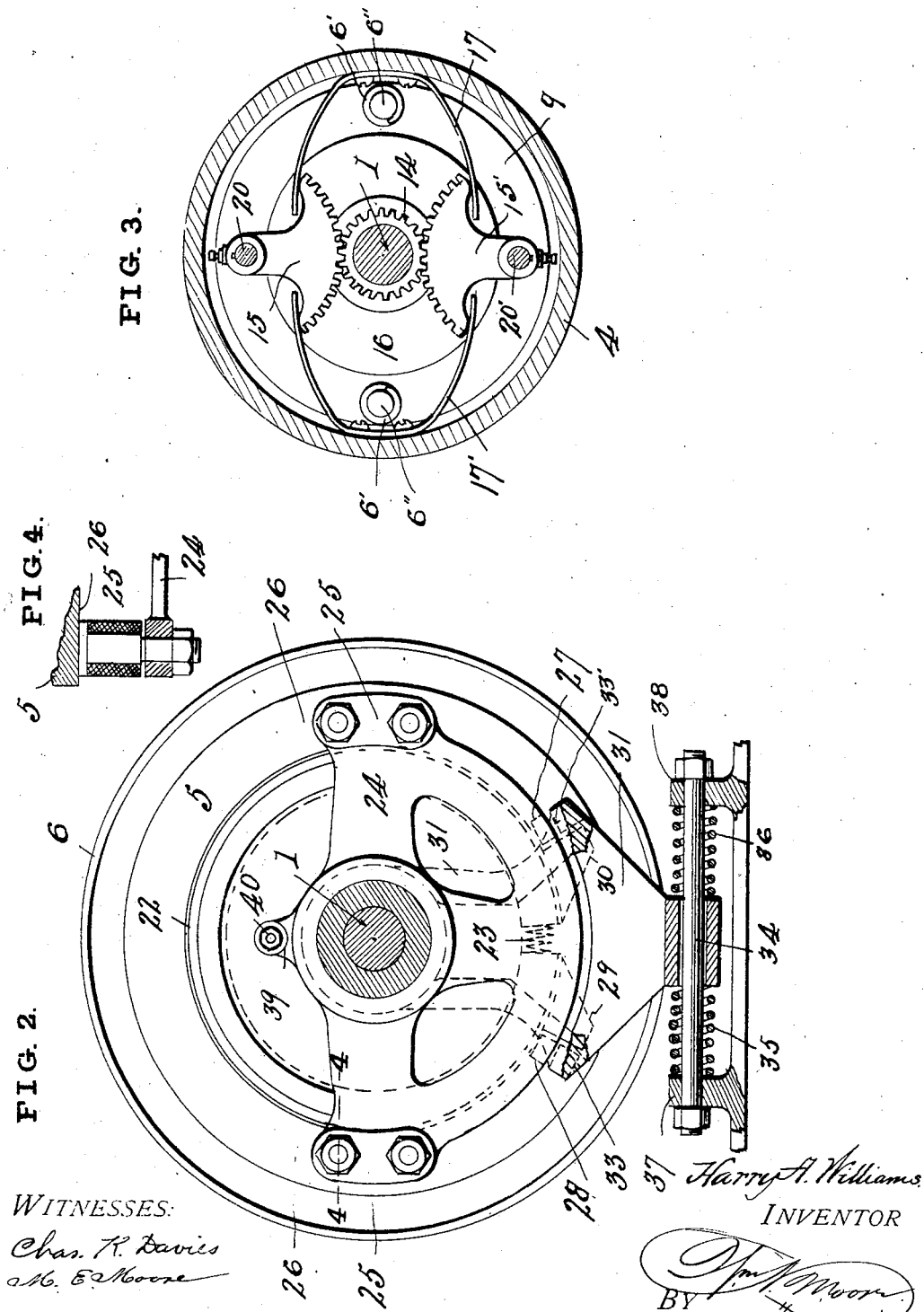

No. 785,926. PATENTED MAR. 28, 1905.
H. A. WILLIAMS.
FRICTION CLUTCH.
APPLICATION FILED MAY 12, 1904.

4 SHEETS—SHEET 3.

WITNESSES:
Chas. K. Davis.
M. E. Moore.

Harry A. Williams
INVENTOR
By
Attorney

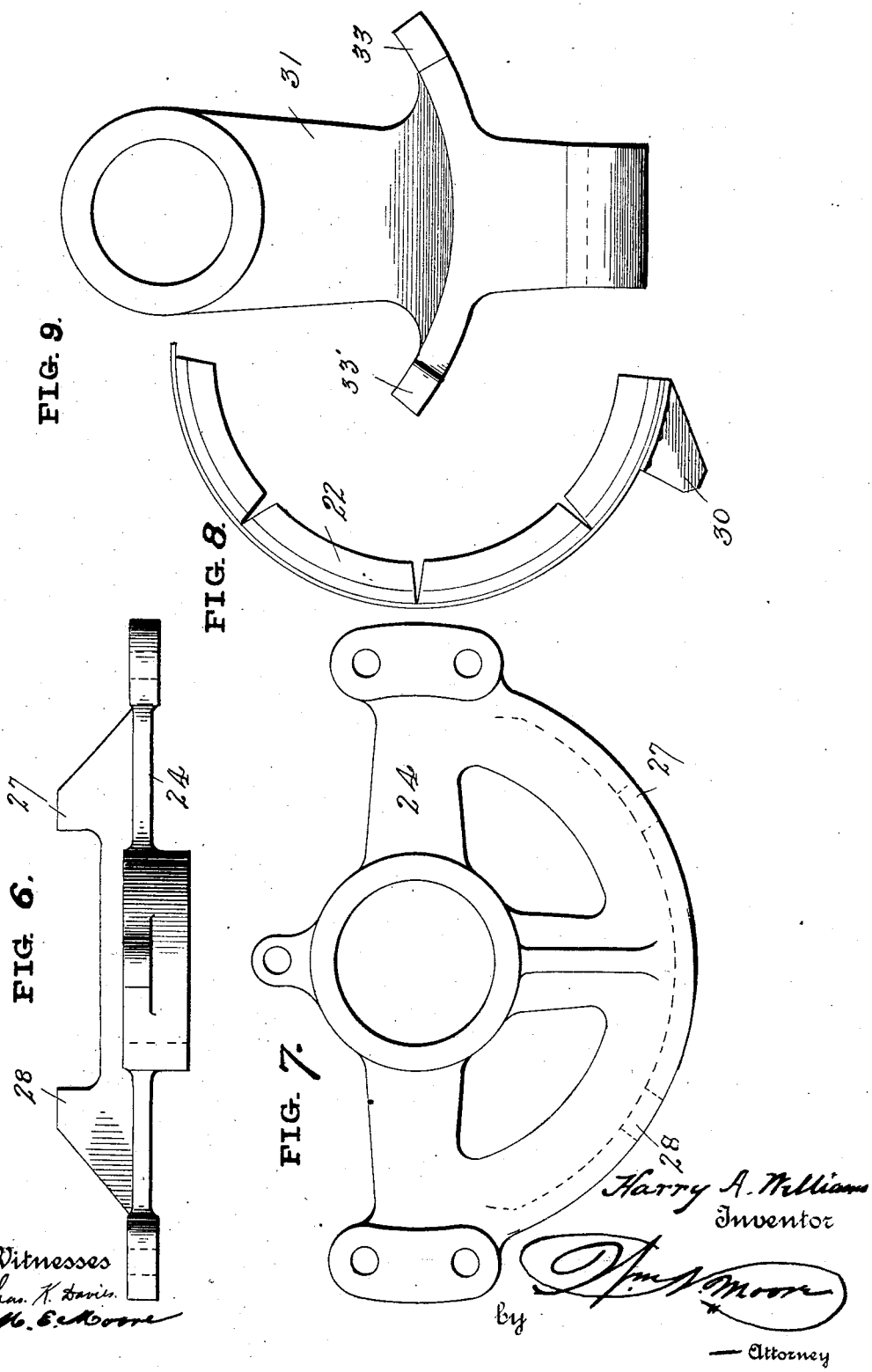

No. 785,926.                                                                 Patented March 28, 1905.

UNITED STATES PATENT OFFICE.

HARRY A. WILLIAMS, OF AKRON, OHIO.

FRICTION-CLUTCH.

SPECIFICATION forming part of Letters Patent No. 785,926, dated March 28, 1905.

Application filed May 12, 1904. Serial No. 207,961.

*To all whom it may concern:*

Be it known that I, HARRY A. WILLIAMS, a citizen of the United States, residing at Akron, in the county of Summit and State of Ohio, have invented certain new and useful Improvements in Friction-Clutches, of which the following is a specification.

My invention relates to improvements in friction-clutches, and has for its object the provision of a clutch mechanism which may be controlled by electrical connections and the members of the clutch be adapted to be thrown into or out of frictional engagement. In the operation of engagement it is desirable that the contact of the frictional surfaces be a gradual one, and I have provided for this by utilizing the electric current to cause a gradual increase in the friction between the contact-surfaces of the two members or cones of the clutch, thus causing the driven member to start without a jerk and have its speed increased gradually. In case of accident or where it is desirable to have the parts disengaged the disengagement will be instantaneous, and in connection with the clutch mechanism I employ a brake mechanism, also controlled electrically and by means of which the driven member of the clutch after being disengaged can be immediately stopped. In some cases of installation of the mechanism I employ a safety-wire with electrical connections and provide an annunciator located in a suitable place, by which in case of accident or trouble with the machinery to which the clutch is attached the defect may be noted at once on the annunciator by the electrical connections.

My invention is adapted for use particularly with automobiles or other vehicles or machines wherein a gradual increasing engagement of the clutch and likewise increase of speed of the driven member is desired or where an instantaneous disengagement is desirable; but it will be understood that the mechanism of my invention may be applied to any class of machines where such a device is desirable or necessary.

My invention consists of a clutch mechanism controlled by electricity from a central point of switch having wire connections from the switch to the machine or machines and an indicating-wire connected with an annunciator suitably placed for observation, so that in case of accident or the stoppage of the machinery for any cause the fact of such stoppage will be conveyed by the annunciator.

My invention further consists in certain novel features described in the specification, illustrated in the drawings, and particularly pointed out in the claims.

In the drawings, Figure 1 is a central vertical sectional view of a clutch mechanism practically applied and embodying my invention. Fig. 2 is a transverse section on line 2 2, Fig. 1. Fig. 3 is a transverse section on line 3 3, Fig. 1. Fig. 4 is a detail section on line 4 4, Fig. 2. Fig. 5 is a diagrammatic illustration of the electrically-connected parts, showing switch and wiring therefrom to the clutch mechanism. Fig. 6 is a top plan view of the magnet-supporting arm. Fig. 7 is a side elevation of the magnet-supporting arm. Fig. 8 is a side view of one half of the brake-band, the other half being similar to the portion shown. Fig. 9 is an inner elevation of the brake-arm.

In the example illustrated in Fig. 1 and other figures I have shown the shaft 1 mounted on suitable bearings 2 2, said shaft carrying the pulley 3, which in this instance is the driving-pulley of the clutch mechanism and is keyed to the shaft 1 and rotates therewith. A cone 4, which forms one of the members of the clutch mechanism, is also keyed to the shaft 1 and rotates therewith. The second clutch member or cone 5 is loosely mounted on the shaft 1 and rotates therewith only when said members are in frictional contact. Springs 6', located on studs 6'', secured in ring 7, have bearing against the ring 9 and cone 4, and thus tend to keep the members separated.

The member 4 has an exterior cone-shaped periphery 4', and the member 5 has a complementary interior cone-shaped surface 5'. Thus when said cones are drawn toward each other they are held by frictional contact of the cone-shaped surfaces 4' and 5' on the members of the clutch and will then rotate together with shaft 1.

Clutch member 5 carries pulley-wheel 6, which is rigidly keyed thereto and adapted to rotate therewith, and when pulley 3 is driven and the clutch is in engagement said pulley 6 will convey power to the desired point by belt or otherwise.

The member 5 is bored out and seats formed, substantially as shown in cross-section, for the magnet and connections for operating the clutch. A ring 7 is secured by studs 8 to the member 5 and is provided with a flange 7', which holds the ring 9 supported by and surrounding ring 7. Ring 7 forms one of the poles of the magnet. A smaller ring 10 loosely surrounds shaft 1 and is secured to cone 5 and is wire-wound, forming the armature 10'. The cone 4 carries a pair of shafts 20 20'. On one end of each shaft is located an adjusting nut or nuts and washers. An opening is provided in ring 9, through which the shaft passes, and head 11, having a cam-surface 12, is seated in the cam-ring 13, located in a groove in the ring 9.

Pinion 14 is loosely located on shaft 1 and engages with segmental gears 15 15', rigidly supported on shafts 20 20', and said pinion is secured to the armature-disk 16, which disk acts against ring 7. The segmental gears 15 15' are held in their normal positions by two double springs 17 17', which are secured to and project from the side of the cone 4.

On the outside of cone 5 an annular groove 21 is formed, in which is seated and adapted to frictionally contact the brake-band 22. A spring 23 is located between the ends of the brake-band and tends to keep the said band out of frictional contact with the sides of the groove 21. Lugs 29 and 30 are provided on the ends of the brake-band for engagement or disengagement of said brake-band, as will be described.

The hub of the cone 5 carries a loosely-mounted arm 24, which supports brake-operating magnet 25, said magnet being located in proximity to the face 26 of the cone 5. Arm 24 has two lugs 27 28, which are located in the path of the lugs 29 and 30 on the ends of the brake-band. Also loosely located on the hub of the cone 5 is the arm 31, held in place by collar 32. Said arm 31 has two lugs 33 33', which are located in the path of movement of lugs 29 and 30 of the brake-band and are acted against by said lugs.

The end of the arm 31 has an eye through which bolt 34 is passed, which has located thereon two springs 35 36, one on each side of the eye, and held between said eye and supporting-lugs 37 and 38 of the frame of the machine. Bolt 34 is secured in said lugs by nuts at each end thereof.

Projecting upwardly from the hub of arm 24 is a lug 39, which supports a brush-holder 40, carrying the brush 41, which rests on the metallic electrical contact-ring 42, said ring being suitably insulated from the hub of cone 5.

Assuming the clutch members to be disengaged and power being applied to pulley 3, the shaft 1 is rotated, carrying with it cone 4, ring 9, disk 16, &c., and the remaining parts of the clutch remain at rest. To engage the clutch members and revolve pulley 6 and transmit power to the same, the switch 40' is moved to point 40", thus closing circuit through resistance and magnet 10', which draws the armature-disk 16 into contact with face of ring 7, and the friction thus caused between disk 16 and ring 7 rotates the disk 16, carrying with it the pinion 14, said disk and pinion being rigid with relation to each other, which movement rocks the segmental gears 15 15', by which the shafts 20 20' are turned. The rotation of the shafts turns the cam-heads 12 in their seats in cam-ring 13, and this cam action draws cone 4 nearer to cone 5, the surfaces 4' and 5' being in frictional contact, thus imparting motion to the pulley 6 through cone 5.

Referring to Fig. 5, as the resistance is cut out by passing switch 40' to point 41' the current is increased, thus increasing friction between clutch members through the magnet 10'. This permits the clutch to be gradually engaged, and the speed of the clutch is correspondingly increased.

In case of accident if there be an increased strain on safety-wire 50, which is attached to any part of the machine desired, it will cause the pawl 51 to release the switch, which will pass over point 40", thus disengaging the clutch. The tension of the spring 52 is released when the switch reaches its central position; but the momentum it has gained causes the switch to swing over to stop 56. Here it is held by pawl 54 in notch 55 on point 56, thus closing the circuit through magnets 25, which are attracted to face 26 on the cone 5. The friction thus caused swings arm 24 about the shaft 1 until lug 27 strikes lug 30 and lug 29 strikes lug 28 of arm 31. This tightens the brake-band in its groove, and the friction tends to brake or stop cone 5 and its fixed parts from revolving, together with the machinery driven from pulley 6. The resistance to the brake is taken up by bolt 34 and cushioned by springs 35 or 36, according to the direction of rotation. The clutch may again be engaged in usual manner. To disengage the clutch without applying the brake, the pawl 51 is lifted and switch 40' is brought to its central position easily.

What I claim is—

1. The combination with a shaft, a driving clutch member and a driven clutch member mounted rigidly and loosely respectively thereon, a magnet on the driven member and an element adapted to be attracted by the magnet and to operate mechanical means whereby said clutch members are brought into engagement.

2. In a clutch mechanism, a shaft, a driving member and a driven member, said members provided with complementary inclined frictional contact-surfaces and the driven member provided with a pulley, a magnet on the driven member and an element located on the shaft adapted to be attracted by said magnet and to operate means whereby said inclined surfaces are brought into frictional contact.

3. In a clutch mechanism, a shaft, a driving member and a driven member, a magnet consisting of a coil surrounding the shaft and a metallic ring rigid with the driven member, and an armature-disk adjacent said ring and connected with means, whereby, when said disk is attracted to said ring and brought into frictional contact therewith, said clutch members are brought into engagement.

4. In a clutch mechanism, a shaft, a driven member and a driving member, a cam-ring located on the driven member, means connecting said cam-ring with the driving member, and mechanism adapted to be operated by electrical connections in connection with the cam-ring, for engaging said clutch members.

5. In a clutch mechanism, a shaft, a driving member and a driven member, a cam-ring on the driven member connected by a shaft having a cam-head to the driving member, and means connected with said shaft and operated by a magnet located on the driven member for bringing said clutch members into frictional engagement.

6. In a clutch mechanism, a shaft, a driving member and a driven member, a cam-ring on the driven member, shafts having cam-heads connecting said cam-ring with the driving member, a pinion on the shaft connected with pinions on the cam-shafts and means operated by a magnet on the driven member for rotating said pinion and through the described connections bringing the clutch members into engagement.

7. A clutch mechanism consisting of a driving member and a driven member located on a shaft as described, a cam-ring on one member connected by shafts having cam-heads to the other member, segmental gears on said shafts and a pinion on the shaft meshing therewith, an armature-disk connected with said pinion, and a magnet, whereby when said disk is attracted to frictional contact with a moving part of the magnet, the described connections are operated to bring the clutch members into engagement.

8. In a clutch mechanism, a shaft, a driven member and a driving member, a magnet and an element adapted to be attracted by the magnet and to operate means whereby the clutch members are brought into engagement; and a brake-band surrounding a portion of the driven member provided with a spring for disengaging said brake, and electrical connections for operating said brake.

9. The combination of two clutch members, rock-shafts connecting said members, a main shaft and a pinion thereon, means connecting said pinion with said rock-shafts, and means whereby, when said shafts are rocked by said pinion, said clutch members are brought into contact.

10. A shaft, a driving and a driven clutch member, rock-shafts connecting said members, a pinion on the shaft and a gear on each rock-shaft meshing with said pinion, means for holding said gears in normal position, connections between the rock-shafts and driven member, whereby, when said pinion is rotated, the clutch members are brought into engagement.

11. A shaft, a driving and a driven clutch member, rock-shafts connecting said members, a pinion on the shaft and a gear on each rock-shaft meshing with said pinion, springs for holding said gears in normal position, and connections between the rock-shafts and driven member, whereby, when said pinion is rotated, the clutch members are brought into contact.

12. The combination of two clutch members, rock-shafts connecting said members, a main shaft and a pinion thereon, a gear on each rock-shaft connected with said pinion, an armature-disk also connected to said pinion and a magnet for operating said disk, and means, whereby, when said disk is operated, the clutch members are brought into engagement through the described connections.

13. The combination of two clutch members, a cam-ring on one member, rock-shafts having cam-head seated in said cam-ring and connecting the two members, a gear on each rock-shaft, and a shaft having a pinion thereon meshing with said gears, springs for holding said gears in normal position, and means for operating said pinion whereby the clutch mechanism is brought into engagement.

14. The combination of two clutch members, a cam-ring on one member, rock-shafts having cam-heads seated in said cam-ring and connecting the two members, a gear on each rock-shaft, and springs for holding said gears in normal position, the main shaft having a pinion meshing with said gears, and an armature-disk connected with said pinion; a magnet located to rotate with one of said members and adapted to rotate said disk, thus bringing the clutch mechanism into engagement through the described connections.

15. The combination of two clutch members located on a shaft as described, a magnet and an element adapted to be attracted by the magnet whereby the clutch members are brought into contact; a groove in one of the members having therein a brake-band, lugs on the ends of said brake-band, and a sleeve surrounding said shaft having an extension or arm provided with lugs located in the path of said lugs on the brake-band, and means for bringing said pairs of lugs in contact for engaging the brake-band with the clutch member.

16. In a clutch as described, a shaft having thereon an arm provided with magnets adapted to frictionally contact with the driven member of the clutch, lugs on said arm, and a brake-band adapted for engagement with the driven member provided with lugs on its end in the path of movement of said lugs on the arm, and a second arm located on the shaft and provided with lugs in the path of movement of said brake-band lugs, and electrical connections for operating said first-mentioned arm to close the brake mechanism.

17. The combination in a clutch as described, a shaft, having thereon an arm provided with magnets, said magnets adapted to frictionally contact with one member of the clutch, lugs on said arm; and a brake-band adapted to frictionally contact with said clutch member having lugs in the path of movement of the lugs on said arm, electrical connections for operating said magnets to close the brake mechanism, and means for cushioning the movement of said arm and brake-band.

18. The combination in a clutch as described, a shaft having thereon an arm provided with magnets adapted to frictionally contact with a part of said clutch, a brake-band on the clutch having projections at each end, lugs on the arm located in position to strike said projections when said arm is turned through the means of said magnets, electrical connections for operating said magnets, and a second arm located on the shaft having lugs in the path of movement of said brake-band lugs, and means connected to said second arm for cushioning the movement of the described elements.

19. The combination in a clutch as described, a shaft, an arm provided with magnets located on said shaft, said magnets adapted to frictionally contact with a part of the clutch, a brake-band on the clutch having projections on each end, lugs on said arm located in position to strike said projections when said arm is turned through the action of said magnets, and a second arm located on the shaft having lugs in the path of movement of said brake-band lugs, and springs connected to said second arm for cushioning the movement of the described elements.

In testimony whereof I affix my signature in presence of two witnesses.

HARRY A. WILLIAMS.

Witnesses:
    LEWIS D. SLUSSER,
    RAY BEACH.